United States Patent [19]
Suzuki et al.

[11] Patent Number: 6,052,075
[45] Date of Patent: Apr. 18, 2000

[54] DATA PROCESSING DEVICE HAVING A D/A FUNCTION

[75] Inventors: Koji Suzuki, Yokohama; Jyoji Nagahira; Kouki Kuroda, both of Tokyo, all of Japan

[73] Assignee: Canon Kabushiki Kaisha, Tokyo, Japan

[21] Appl. No.: 08/317,780

[22] Filed: Oct. 4, 1994

Related U.S. Application Data

[63] Continuation of application No. 07/884,880, May 18, 1992, abandoned, which is a continuation of application No. 07/489,733, Feb. 28, 1990, abandoned, which is a continuation of application No. 07/279,336, Dec. 2, 1988, abandoned, which is a continuation of application No. 06/828,668, Feb. 12, 1986, abandoned, which is a continuation of application No. 06/410,481, Aug. 23, 1982, abandoned.

[30] Foreign Application Priority Data

Sep. 3, 1981 [JP] Japan .................................. 56-137793
Sep. 3, 1981 [JP] Japan .................................. 56-137794

[51] Int. Cl.[7] .................................................. H03M 1/66
[52] U.S. Cl. .......................... 341/144; 341/110; 341/152
[58] Field of Search .................................. 364/139, 180, 364/600, 601, 733, 800, 829, 852, 858, 522, 567; 340/347 NT, 347 AD; 355/14 C, 14 CH; 341/144–154, 110, 108; 327/172, 176

[56] References Cited

U.S. PATENT DOCUMENTS

| | | | |
|---|---|---|---|
| 2,950,472 | 8/1960 | Ronley | 340/347 DA |
| 3,540,035 | 11/1970 | T.li | 340/347 DA |
| 3,576,561 | 4/1971 | Dureau | 340/347 DA |
| 3,594,782 | 7/1971 | Carbrey | 340/347 DA |
| 3,665,458 | 5/1972 | Mulkey et al. | 340/347 DA |
| 3,831,167 | 8/1974 | Tewksbury | 340/347 DA |
| 3,889,254 | 6/1975 | Kobayashi | 340/347 AD |
| 4,016,540 | 4/1977 | Hyatt | 364/200 |
| 4,030,092 | 6/1977 | Sieber et al. | 340/347 DA |
| 4,118,772 | 10/1978 | Takada | 364/200 |
| 4,126,853 | 11/1978 | Frerking | 340/347 DA |
| 4,200,863 | 4/1980 | Hodges et al. | 340/347 DA |
| 4,306,223 | 12/1981 | Weber | 340/347 DA |
| 4,310,893 | 1/1982 | Loshbough | 364/567 |
| 4,373,188 | 2/1983 | Dowding | 364/552 |
| 4,420,247 | 12/1983 | Suzuki et al. | 355/14 C |
| 4,617,550 | 10/1986 | Glincman | 340/347 AD |
| 4,620,178 | 10/1986 | Naito | 340/347 AD |

OTHER PUBLICATIONS

P. Horowitz and W. Hill, "*The Art of Electronics*", 1980, p. 521.
A. Redstone, "*Analog–to–Digital Conversion*", Micro–Computing, Apr. 1980, pp. 28–31.
Cotter, "The Amazing 1802: D/A and A/D Applications," Kilobaud, Aug. 1978, pp. 102–107.
Carr, Joseph J., "Microcomputer Interfacing Handbook: A/D & D/A," Tab Books, Inc., 1980, pp. 302–309.

*Primary Examiner*—Paul V. Kulik
*Attorney, Agent, or Firm*—Fitzpatrick, Cella, Harper & Scinto

[57] ABSTRACT

A data processing device capable of digital processing of analog data and obtaining analog output signals from the result of digital processing, without the use of analog-digital converters or digital-analog converters.

3 Claims, 6 Drawing Sheets

DATA PROCESSING DEVICE HAVING A D/A FUNCTION

This application is a continuation-in-part, of application Ser. No. 07/884,880 filed May 18, 1992, now abandoned, which was a continuation of application Ser. No. 07/489,733 filed Feb. 28, 1990, now abandoned, which was a continuation of application Ser. No. 07/279,336 filed Dec. 2, 1988, now abandoned, which was a continuation of application Ser. No. 06/828.668 filed Feb. 12, 1986, now abandoned, which was a continuation of application Ser. No. 06/410,481 filed Aug. 23, 1982, now abandoned.

BACKGROUND OF THE INVENTION

1. Field of the Invention

The present invention relates to a data processing device including so-called microcomputer for digital signal processing for the purpose of circuit or function control in the copier or the like, and more particularly to a data processing device provided with analog-digital converting function for input analog signals and digital-analog converting function for obtaining output analog signals.

2. Description of the Prior Art

In the data processing device of the above-mentioned sort, comprising so-called microcomputer for function control of the copier or the like, in which the input data from an external sequence controller etc. are processed in a digital circuit according to predetermined programs, it is generally necessary to convert input signals, if in analog form, into digital signals, and to convert the output digital signals into analog signals if such analog output data are desired.

The conventional data processing device of this sort is generally used in combination, according to the necessity, with a separate analog-digital converter for generating signals required for digital processing from input analog signals and a separate digital converter for obtaining output analog signals corresponding to the results of the digital processing. Such converter or converters may be incorporated in the data processing device itself, but such incorporation with the conventional circuitry merely includes the ordinary converters and the ordinary data processing device on a same chip, thus leading inevitably to a complicated circuit structure. Consequently such conventional device is inevitably large in size and involves an increase in the hardware structure, thus giving rise to an insufficient reliability.

SUMMARY OF THE INVENTION

In consideration of the foregoing, the object of the present invention is to provide a data processing device capable of digital data processing without additional analog-digital and/or digital-analog converters.

Another object of the present invention is to provide a data processing device capable of providing the result of data processing in the form of analog output signals without a major change in the circuit structure but through an appropriate programming.

Still another object of the present invention is to provide a data processing device provided with an analog-digital converting function for the input analog signals and a digital-analog converting function for obtaining analog output signals, which are achieved through a change in the data processing program in a so-called microcomputer.

Still another object of the present invention is to provide a data processing device adapted for use in the power control etc. in a copier or the like.

The foregoing and still other objects of the present invention will be made fully apparent from the following description.

BRIEF DESCRIPTION OF THE DRAWINGS

FIGS. 7A, B composed of FIGS. 7-1 and 7-2 are flow charts showing examples of data processing program and digital-analog converting subroutine according to the present invention and FIG. 7C is a chart showing an example of data memory in the course of data processing.

DETAILED DESCRIPTION OF THE PREFERRED EMBODIMENTS

Now the present invention will be clarified in detail by the following description to be read in conjunction with the attached drawings.

Figure 1:
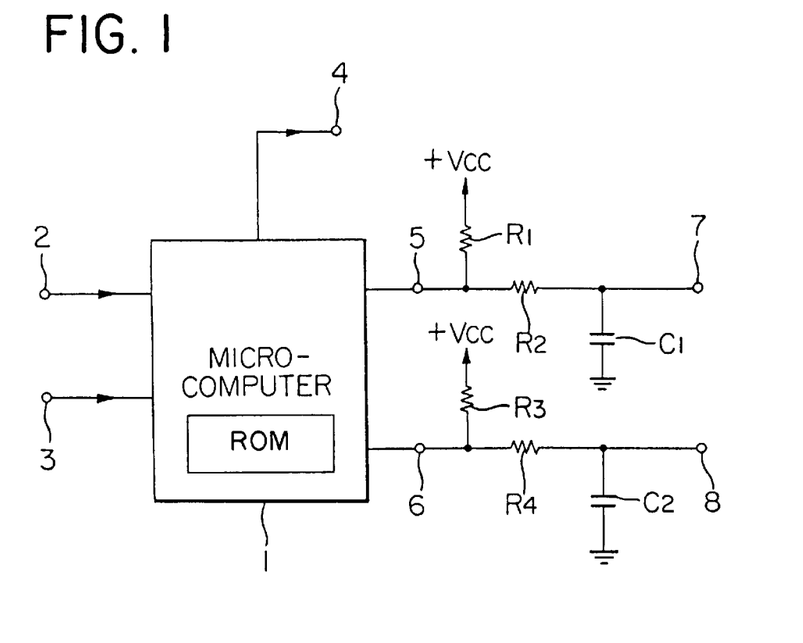
FIG. 1 is a block diagram of a first embodiment of the data processing device of the present invention.

FIG. 1 shows an embodiment of the data processing device of the present invention, wherein shown are an ordinary microcomputer 1 with an incorporated timer, composed for example of Intel 8048; control input ports 2; data input ports 3; process output ports 4; digital-analog conversion output ports 5, 6; and integrated output terminals 7, 8 for providing two output signals to be generated periodically or intermittently as will be explained later through integrators or low-pass filters composed of resistors R1, R2, R3, R4 and condensers C1, C2.

Figure 2:
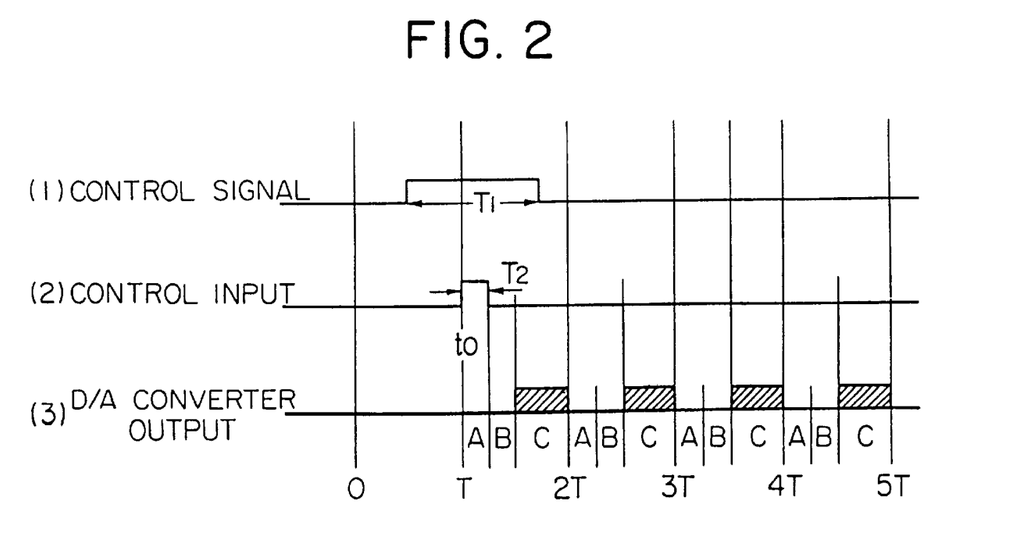
FIG. 2 is a timing chart showing an example of function mode of said data processing device.

Now reference is made to FIG. 2 showing the function of the above-described data processing device of the present invention. A square-wave control signal with a duration T1, shown in (1), is supplied for example from an external sequence controller through the control input ports 2. Also data signals in the form of digital signals are supplied for example from an external analog-digital converter through the data input ports 3. The microcomputer 1 accepts the above-mentioned control signal and data signals at determined timing and executes the data processing in the following manner, according to a program for example stored in a read-only memory, in response to said control signal.

The timer incorporated in the microcomputer 1 divides the processing time into repeated periods T as shown in (3), and each period T is further divided into times zones A, B and C. The duration T1 of the control signal shown in (1) is determined longer than said period T, so that the control signal always exists in the time zone A of the period T immediately following the start of said control signal. Consequently said control signal is received in said time zone A as a control input signal of a duration T2 as shown in (2), and the data input signals received from the ports 3 are processed in the succeeding time zone B according to a program determined in response to said control input signal. A part of digital signals obtained by said data processing is immediately taken out and supplied to digitally controllable circuits.

Also in the succeeding time zone C, there is executed a digital-analog conversion for converting said digital process output signals into analog signals for supply to the analog-controlled circuits. Upon entering the time zone C from the zone B, the logic levels of the output ports 5, 6 are shifted immediately from "0" to "1" and latched in this state throughout said time zone C.

Also in the ensuing periods T, the high logic level "1" is maintained in respective time zones C over a period corresponding to the value of the digital signal obtained by the data processing. In this manner the digital process output signals are converted into a pulse train in which pulses of a duration C are intermittently distributed over plural period according to the digital value of said output signal. An analog process output signal can therefore be obtained, without so-called diqital-analog conversion, by integrating the voltage of said pulses with the above-mentioned integrator or low-pass filter, and a smoothed DC analog signal is obtained by smoothing by a CR integrating circuit.

In the above-mentioned example the microcomputer 1 is not synchronized with the control signal A, and, for this reason, the duration T1 of said control signal is selected longer than the period T in order that the control input signal (2) can always be obtained in the time zone A. Then FIG. 3 shows another example of function mode of the data processing device in which the microcomputer 1 is synchronized with the control signal supplied for example from an external sequence controller.

Figure 3:
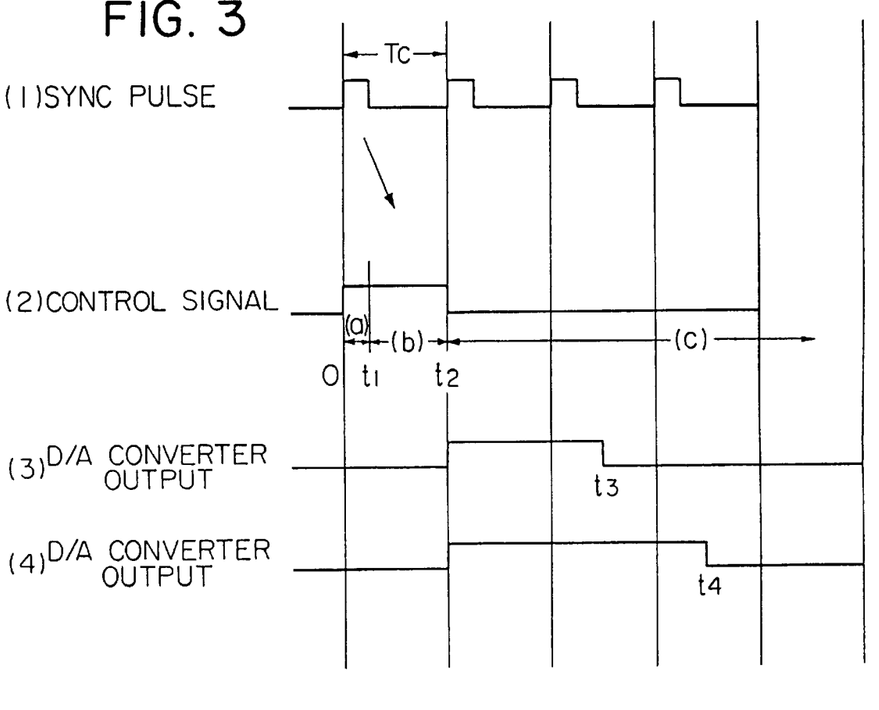
FIG. 3 is a timing chart showing another example of function mode of said data processing device.

In the function mode shown in FIG. 3, an external device generates synchronizing pulses with an interval Tc as shown in (1), in response to which the microcomputer 1 executes the data processing.

An external sequence controller generates a synchronizing signal of a duration equal to the interval Tc of the above-mentioned synchronizing pulses as shown by (2), and said synchronizing signal is supplied to the microcomputer 1 as the control signal already explained in relation to FIG. 1. Said control signal is entered in a time zone (a) from the start of the control signal shown in (2) to a time t1, and the separately received data signals are processed as explained in the foregoing within a remaining time zone (b). Output ports 5, 6 are shifted to the high logic level "1" at the end t2 of said time zone (b). Latch circuits are respectively inserted between said output ports 5, 6 and the CR integrating circuits shown in FIG. 1, so that said high logic levels are maintained, from the start t2 of the time zone (c) succeeding to the time zone (b), over periods reaching t3, t4, corresponding to the digital values obtained by said data processing. Analog process output signals corresponding to the periods of said high logic level are obtained through the CR integrating circuits. In order to reduce the integrating time in such CR integrating circuit, it is possible to employ two units of the CR time-constant circuit shown in FIG. 1 in serial connection for constituting a secondary low-pass filter. Also the number of the integrated output terminals 7, 8 may be increased, or reduced to one. Furthermore, in the above-described synchronized function mode, it is also possible to provide output pulses of a determined duration in a number corresponding to the result of data processing.

As explained in the foregoing, the present invention allows to execute the necessary digital-analog conversion in addition to the data processing by means of an ordinary microcomputer for data processing without the use of an additional digital-analog converter but with a simple modification in the circuitry in combination with a suitable programming, thereby enabling to obtain analog control signals required for the control of various circuits or devices directly from the results of data processing with a device much simpler and smaller than before.

In addition to the fundamental digital-analog converting function for converting input digital data into analog data, the device of the present invention is also applicable for conducting suitable data processing in response to the input data and providing the result of said processing in the analog form for controlling for example the high-voltage transformer or motor in a copier.

The signals to be supplied to the CR integrating circuit may be pulse signals of a determined duration generated intermittently over a period corresponding to the digital-analog converted value as shown in FIG. 2, or a continuous signal of a duration corresponding to the digital-analog converted value as shown in FIG. 3, or may further be pulse signals of a determined number of which duty ratio corresponds to the digital-analog converted value.

Now there will be explained another embodiment of the present invention in which the data processing device shown in FIG. 1 is further provided with a function of effecting data processing on the input data entered in the form of analog signals.

Figure 4:
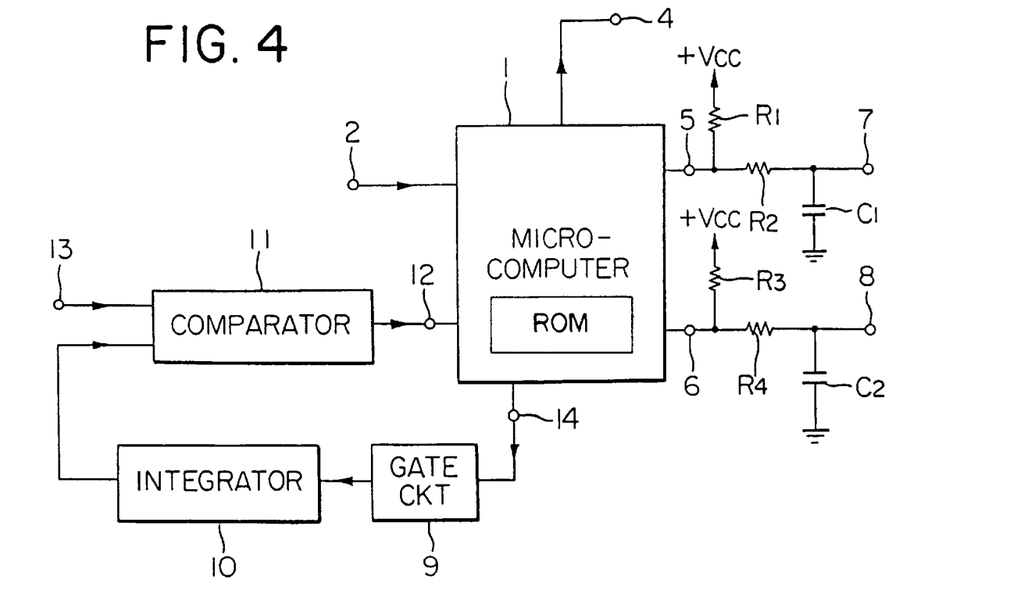
FIG. 4 is a block diagram of a second embodiment of the data processing device of the present invention.

FIG. 4 shows said another embodiment in which the same components as those shown in FIG. 1 are represented by same numbers. In FIG. 4 there are shown a so-called microcomputer 1 for processing input analog signal in response to the control input signals; control input ports 2; an input terminal 13 for input analog signals; output ports 4; an output port 14 for count starting signal for analog-digital conversion; digital-analog conversion output ports 5, 6 for latching the logic level for output; integrated output terminals 7, 8 for providing digital-analog converted output signals; a gate circuit 9; an integrating circuit 10; a comparator circuit 11; and an input port 12 for count stop signal for analog-digital conversion; which are mutually connected as illustrated in FIG. 4.

Figure 5:
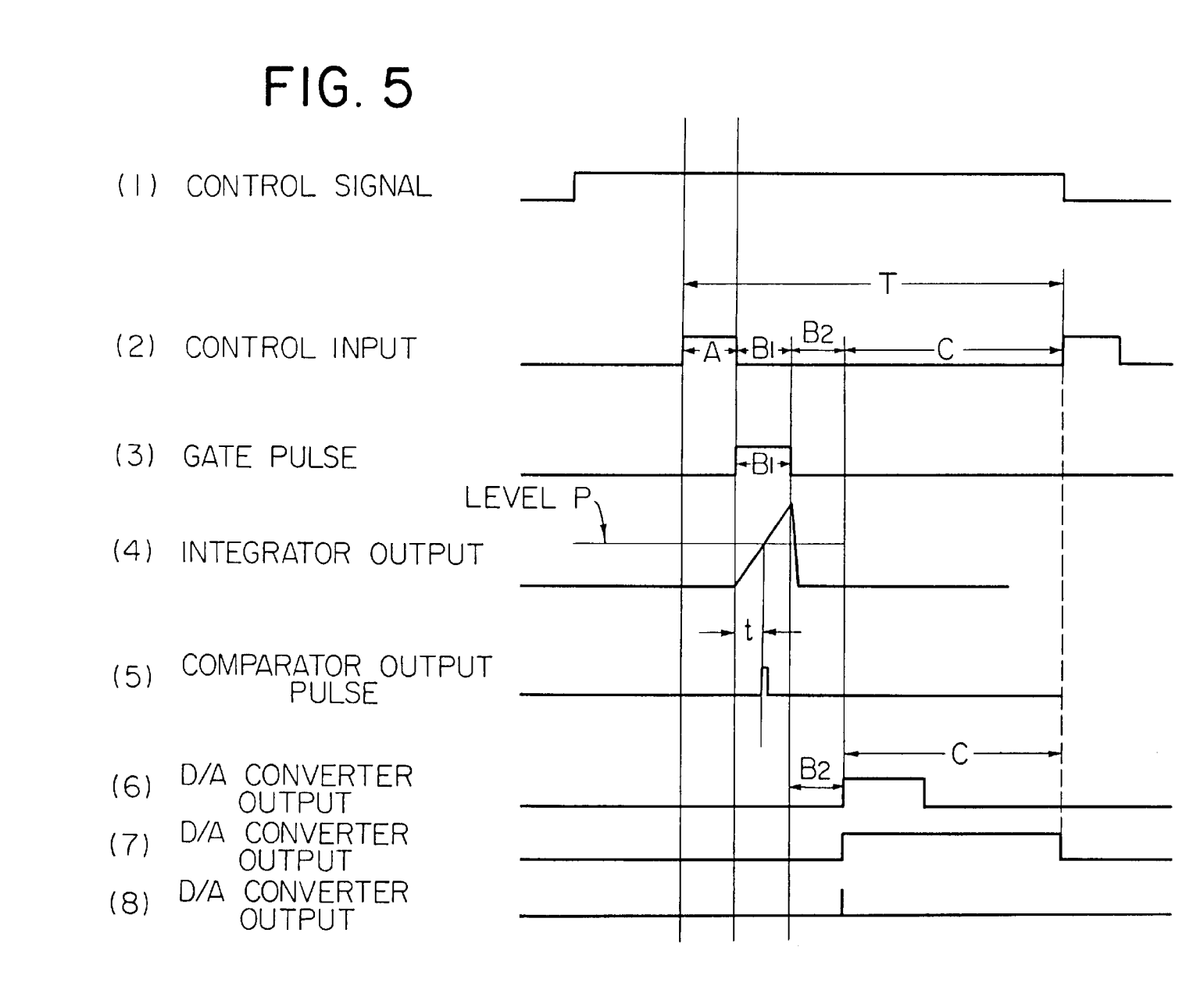
FIG. 5 is a timing chart showing an example of function mode of said data processing device.

Now reference is made to FIG. 5 showing an example of the function mode of the above-described data processing device of the present invention. The microcomputer 1 repeats the data processing with a period T as shown in (2) by the interruption processing with the incorporated timer, and said period is further divide into time zones A, B1 and B2. In said time zone A, the microcomputer accepts the control input signal shown in (1), and decodes the process command by said control input signal. In case said command is a digital-analog conversion for input analog signal, the microcomputer releases a gate pulse shown in (3) from the port 14 and simultaneously initiates to count clock pulses by the incorporated timer, upon entering the time zone B1 from A.

The gate pulse from the output port 14 is supplied through the gate circuit 9 to the integrator 10 to generate an integrated sawtooth signal as shown in (4). Said sawtooth signal is compared with the input analog signal from the input terminal 13 in the comparator circuit 11 to generate a comparator output pulse shown in (5) at a point t where the level of said sawtooth signal exceeds the level P of the input analog signal. Said comparator output pulse is supplied, as a count stop signal, through the input port 12 into the microcomputer 1 to terminate the aforementioned clock pulse counting, whereby the clock pulse count at said termination corresponds to the level P of said input analog signal D and is stored as the digital output of the analog-digital conversion in the microcomputer 1.

Subsequent procedure is same as that in the device shown in FIG. 1. In the succeeding time zone B2, the microcomputer 1 executes the required data processing on the output digital signals of the above-mentioned conversion, and the result of said data processing is partly taken out in the digital form through the output ports 4 and is also supplied to the output ports 5, 6 for conversion into analog signals. The levels of said output ports 5, 6 are shifted to the high logic level "1" at the start of the time zone C and again changed to the low logic level "0" at a timing corresponding to the digital values obtained by the data processing conducted during the time zone B2. Consequently the output port 5 or 6 releases a process output pulse, as shown in (6), of a duration corresponding to the digital values of the result of data process. Thus said pulse extends over the entire time zone C in case the digital values of said result are all "1" as shown in (7) but becomes extremely short as shown in (8) when said digital values are all "0". It is naturally possible also to invert the above-mentioned relationship between the logic level and the digital values of the result of data processing, by the use of a suitable program in the data processing. Such process output pulses released from the output ports 5, 6 are smoothed by integration in the respective CR integrating circuits into DC analog values corresponding to the digital values of the data processing, thus providing the process output signals in the analog form.

In the foregoing embodiment, the duration of the control input signal shown in (1) is selected longer than the period T of the data processing in order that said control input signal is always received in the time zone A, since the microcomputer 1 is not synchronized with the external sequence controller or the like. Now, with reference to FIG. 6 there will be explained another example of the function mode of the data processing device shown in FIG. 4 in which the microcomputer 1 is synchronized with the external sequence controller etc.

Figure 6:
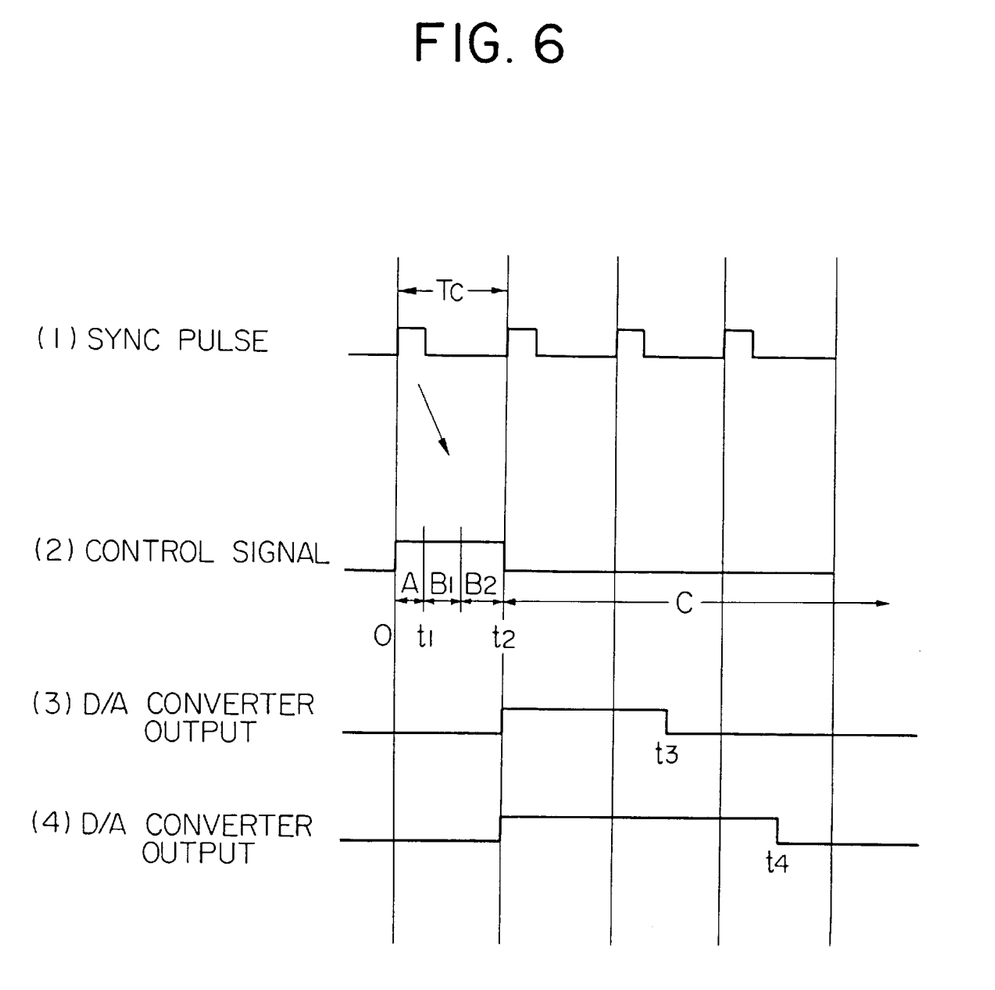
FIG. 6 is a timing chart showing another example of function mode of said data processing device.

In this case, in response to the synchronizing pulses as shown in (1) received from the external sequence controller in synchronization with the data processing periods, the microcomputer 1 decodes the control input signal in the initial time zone A divided in the period T as shown in (2) in the same manner as the aforementioned function mode, then executes the analog-digital conversion of the input analog signals in the time zone B1, the required data processing in the time zone B2 and performs the digital-analog conversion of the digital values of the result of data processing in the time zone C. The process output pulse of a duration t3 as shown in (3) or of a duration t4 as shown in (4) corresponding to the digital value of the result of said data processing is thus generated and integrated to obtain the analog signals in the aforementioned manner.

In order to reduce the integrating time of the CR integrating circuit at the output port 5 or 6 it is preferable, as already mentioned before, to employ two units of similar CR time-constant circuit in serial connection, thus constituting a secondary low-pass filter.

The data processing device of the present invention may be applied as so-called CVR for maintaining a constant voltage in response to a variable power supply voltage, or as a control device for controlling power supply to a motor or a high-voltage transformer in response to an input signal representing the function state of the object to be controlled, for example the revolution of the motor or the voltage of the transformer.

FIG. 7A is a flow chart of the sequence control for the data processing device of the present invention in the manner as explained in relation to FIGS. 2 and 5, and FIG. 7B shows the flow chart of the digital-analog converting subrouting in said sequence control. Also FIG. 7C shows the data memory structure in a random access memory incorporated in the microcomputer 1 in the course of data processing.

Figures 1, 7:
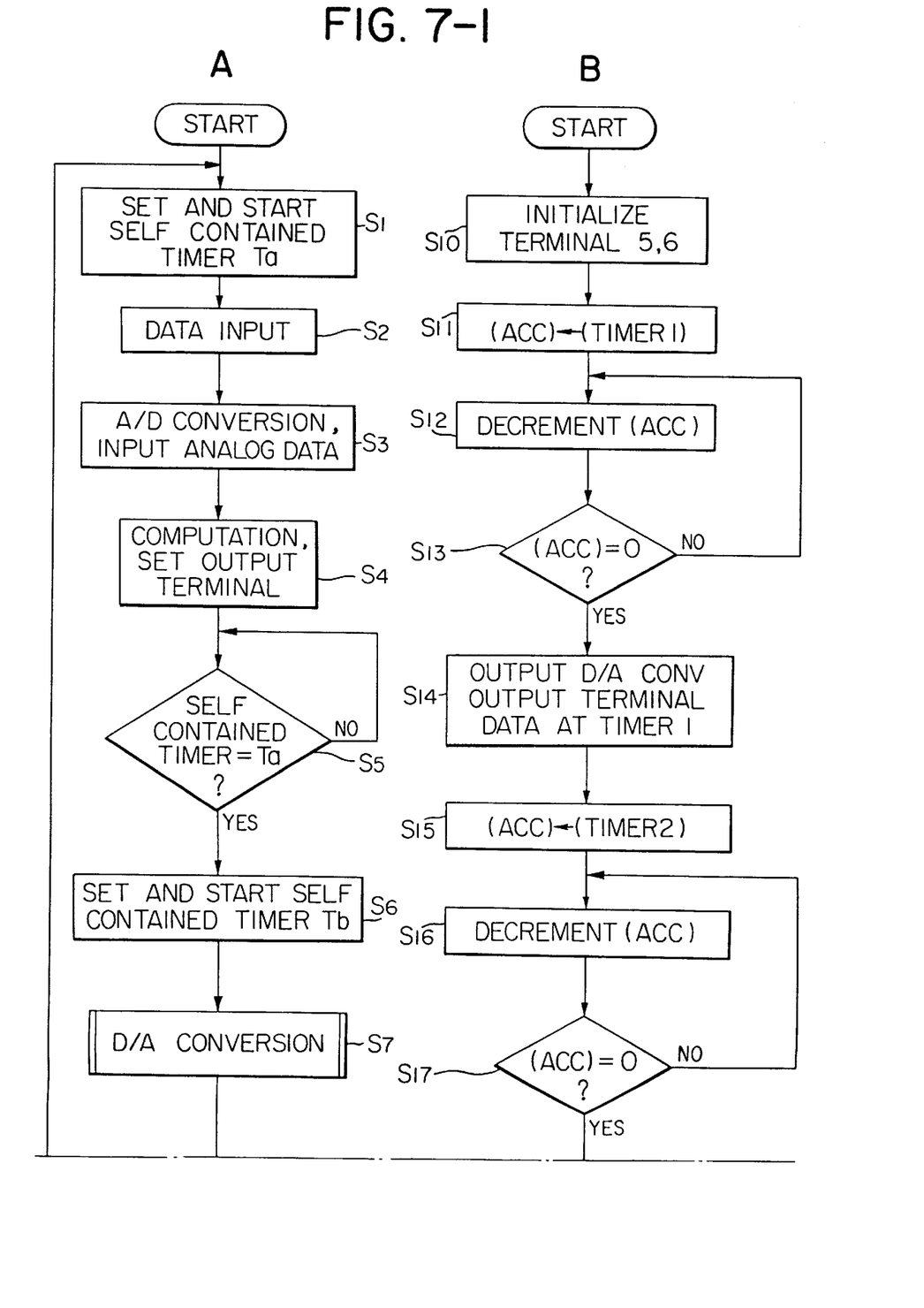
Figure 7:
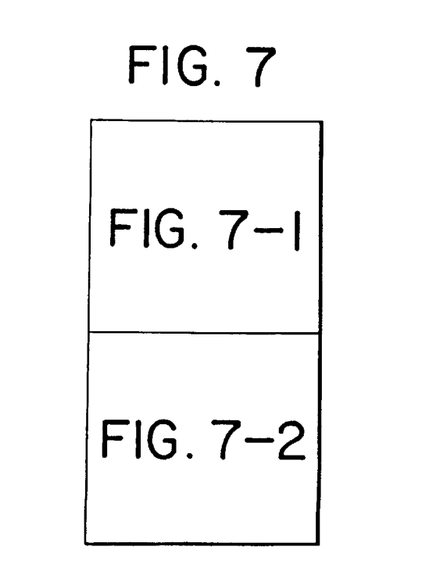
Figure 72:
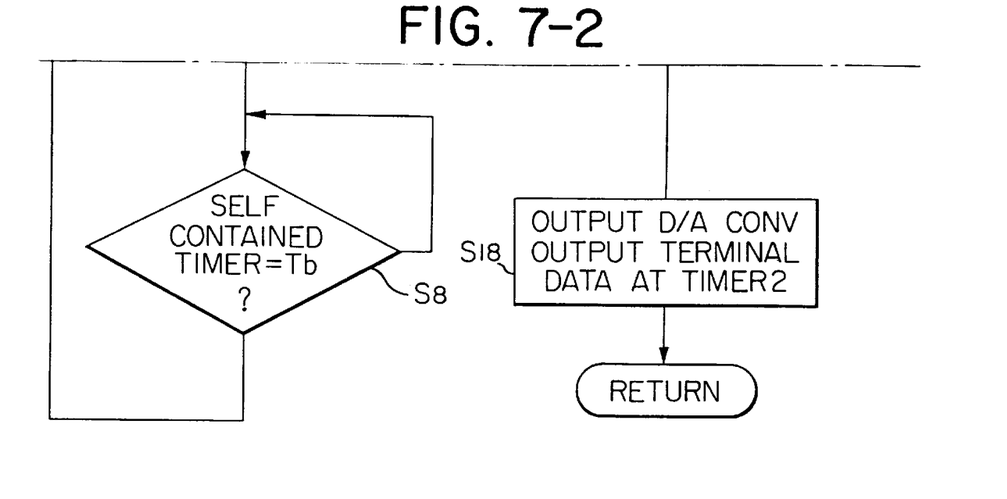

Now reference is made to FIG. 7 showing the data processing procedure explained in relation to FIG. 5. The programs for these sequence controls are stored in a read-only memory of the microcomputer. As explained before, the microcomputer is equipped with an incorporated timer which can be set to values Ta and Tb, whole sum is equal to the aforementioned period T of the data processing (FIG. 5(2)).

At first, the Step S1 sets the value Ta in said timer and starts the function thereof. Thus the time zone A shown in FIG. 5 is initiated at the Step S2, where the control input signal, if present at the port 2, is accepted and analyzed. If said signal represents a command for analog-digital conversion, the analog signals are entered at the Step S3.

In the presence of the analog-digital conversion command, the gate pulse is released from the port 14 upon transfer from the time zone A to B1, and the analog value is recognized and stored as a digital value through comparison the integrated gate pulse with the analog signal in the aforementioned manner.

The time zone B2 is initiated in the Step S4, where the data processing is executed according to the control data received in the Step S2 or the analog-digital converted data received in the Step S3, thereby determining the data to be supplied to the output ports 4 or to the output ports 5, 6. The data to be released through the output ports 4 are released at an arbitrary timing after the completion of data processing. Also the data to be released through the ports 5, 6 are converted into values, for example length of time or number of pulses, corresponding to the analog data to be obtained and are stored in the random access memory in the manner to be explained in relation to FIG. 7C.

It is assumed that D5 and D6 respectively represent data to be released from the ports 5 and 6. At first the smaller one of said data D5, D6 is set in a timer area TIMER1 of the random access memory. Subsequently the difference Dsub of the data D5 and D6, i.e. |D5−D6|, is set in another timer area TIMER2 of said memory. Also data for shifting the output port to the low level according to the data set in the timer area TIMER1 are set in a memory area for the digital-analog conversion output port data at TIMER1, and data for shifting both output ports 5, 6 to the low level according to the data set in the timer area TIMER2 are set in a memory area for the digital-analog conversion output port data at TIMER2. In this manner the preparation for the digital-analog conversion output is completed.

The Step S5 identifies if the counting of the period Ta by the timer is completed, and, if so, the program proceeds to the Step S6, where the timer is set to the value Tb and started. At the same time the time zone C is initiated and the output of digital-analog conversion data is started.

The digital-analog conversion in the Step S6 is executed by the subroutine shown in FIG. 7B to be explained in the following.

At first in said subroutine, the Step S10 initializes the output ports 5, 6 to the high level.

In the step S11, the timer value set in the timer area TIMER1 of the random access memory, i.e. the smaller one of the data D5 and D6, is set in an accumulator ACC. The content of said accumulator is stepwise decreased in synchronization for example with external clock pulses, and, upon identification in the Step S13 that said content has reached zero, the program proceeds to the Step S14 to release the data of the output port corresponding to the timer value of the timer area TIMER1, namely the output port with a smaller timer value. In this manner the port corresponding to the smaller timer value is shifted to the low level, thus terminating the digital-analog conversion output from said port. Simultaneously with said termination the Step S15 is executed to set the difference Dsub, stored in the timer area TIMER2 and equal to the difference of the data D5 and D6, in the accumulator ACC, and the Steps S16, S17 are executed to stepwise decrease the content of said accumulator, and, upon reaching zero, to set the memory data for shifting the output ports 5, 6 to the low level. In the above-described manner the digital-analog conversion output data are respectively released from the output ports 5, 6.

After completing the digital-analog conversion in said subroutine, the program proceeds to the Step S8 in FIG. 7A to identify the completion of the period Tb by the timer, or the termination of the time zone C. After said termination, the program returns to the Step S1 to repeat the processing on new input data.

The processing on input analog data and the output of analog data are conducted in the above-described manner.

In case the input data are in the digital form in the processing shown in FIG. 2, the entry of analog data at the Step S3 in FIG. 7A can be replaced by a digital data entry from the port 3. It is also possible to provide the digital-analog conversion output data in a form represented by the number of pulses of a determined duration. The flow chart shown in FIG. 7 represents a case in which the microcomputer 1 is not synchronized with the external sequence controller, but, in the synchronized function mode as shown in FIG. 3 or FIG. 6, it is possible, as already explained, to control the function timing by external clock pulses instead of the incorporated timer.

Furthermore it is also possible to invert the logic levels of setting-resetting of the output ports 5 and 6.

As explained in the foregoing, the present invention enables to incorporate the functions of analog-digital converter and digital-analog converter, which have conventionally had to be externally attached to the microcomputer, into the data processing by an appropriate modifications in the programming of the microcomputer, thereby achieving all the functions of analog-digital conversion, data processing and digital-analog conversion by programming. In this manner the present invention provides a preferable form of data processing for use for example in copiers.

What we claim is:

1. A data processing device comprising:
   input means for inputting a digital signal to be processed;
   an output terminal for outputting a pulse signal;
   a digital microcomputer for receiving the digital signal from said input means, processing the received digital signal to generate a pulse signal having a duration length corresponding to a processing result, and supplying the generated pulse signal to said output terminal, said digital microcomputer including a read only memory for storing process steps; and
   an integrating circuit for integrating the pulse signal from said output terminal so as to form an analog signal for controlling operation of a device,
   wherein said digital microcomputer executes the stored process steps to (1) input a digital signal at a predetermined timing, (2) determine a value of the input digital signal, (3) store the determined value as an analog value, (4) output, at a predetermined timing, the pulse signal having a duration length corresponding to the stored analog value, and (5) repeat steps 1–4 in order to process a next digital signal.

2. A data processing device according to claim 1, wherein said digital microcomputer executes said first, second, third and fourth stored process steps in response to a control signal from an external device.

3. A data processing device comprising:
   input means for inputting a digital signal to be processed;
   an output terminal for outputting a pulse signal;
   a digital microcomputer for receiving the digital signal from said input means, processing the received digital signal to generate a pulse signal having a number of pulses corresponding to a processing result, and supplying the generated pulse signal to said output terminal, said digital microcomputer including a read only memory for storing process steps; and
   an integrating circuit for integrating the pulse signal from said output terminal so as to form an analog signal for controlling operation of a device,
   wherein said digital microcomputer executes the stored process steps to (1) input a digital signal at a predetermined timing, (2) determine a value of the input digital signal, (3) store the determined value as an analog value, (4) output, at a predetermined timing, the pulse signal corresponding to the stored analog value, and (5) repeat steps 1–4 in order to process a next digital signal.

* * * * *

UNITED STATES PATENT AND TRADEMARK OFFICE
CERTIFICATE OF CORRECTION

PATENT NO. : 6,052,075
DATED : April 18, 2000
INVENTORS : KOJI SUZUKI, et al.

It is certified that error appears in the above-identified patent and that said Letters Patent is hereby corrected as shown below:

<u>COVER PAGE</u>

Under [56] References Cited, U.S. Patent Documents,
    "T.li" should read --T. Li--.

<u>COLUMN 1</u>

Line 4, "continuation-in-part" should read
    --continuation--; and
  Line 10, "06/828.668" should read --06/828,668--.

Signed and Sealed this

Seventeenth Day of April, 2001

Attest:

NICHOLAS P. GODICI

*Attesting Officer*    *Acting Director of the United States Patent and Trademark Office*